United States Patent [19]

Jones et al.

[11] Patent Number: 4,502,493
[45] Date of Patent: Mar. 5, 1985

[54] INFINITE ADJUSTMENT MEANS FOR SIEVE AND CHAFFER SLATS

[75] Inventors: Dennis J. Jones, West Brooklyn; Earl L. Scheidenhelm; Thomas G. Truckenbrod, both of Mendota, all of Ill.

[73] Assignee: Hart-Carter Company, Mendota, Ill.

[21] Appl. No.: 560,500

[22] Filed: Dec. 12, 1983

[51] Int. Cl.³ .............................................. A01F 12/30
[52] U.S. Cl. ...................................... 130/24; 209/394
[58] Field of Search .................. 209/394; 130/24, 26; 56/16.5

[56] References Cited

U.S. PATENT DOCUMENTS

| | | | |
|---|---|---|---|
| 579,793 | 3/1897 | Ditcha | 209/394 |
| 664,811 | 12/1900 | Lippy | 209/394 |
| 665,332 | 1/1901 | Lippy et al. | 209/394 |
| 673,210 | 4/1901 | Lippy | 209/394 |
| 675,745 | 6/1901 | Lippy | 209/394 |
| 755,441 | 3/1904 | Bradley | 209/394 |
| 2,413,382 | 12/1946 | Sargent et al. | 209/394 |

Primary Examiner—Hugh R. Chamblee
Assistant Examiner—John G. Weiss
Attorney, Agent, or Firm—Charles W. Rummler

[57] ABSTRACT

An adjustment means for the slats of sieves and chaffers comprising a manually operable screw mounted on a mounting plate fixed to the chaffer frame and directly connected with the conventional slotted bar for oscillating the slats to clean them and for setting their operating angular position, the screw being normally held on the mounting plate against non-rotative axial movement but releasable for back and forth axial movement to open and close the slats for cleaning purposes; the mounting plate including a latch adapted to engage a noncircular element fixed on the screw to prevent its inadvertent rotation, whereby after being released for operating the slats without rotation the screw is returned to the mounting plate for engagement of the latch, the slats will be positioned precisely in their initially set operating position.

5 Claims, 7 Drawing Figures

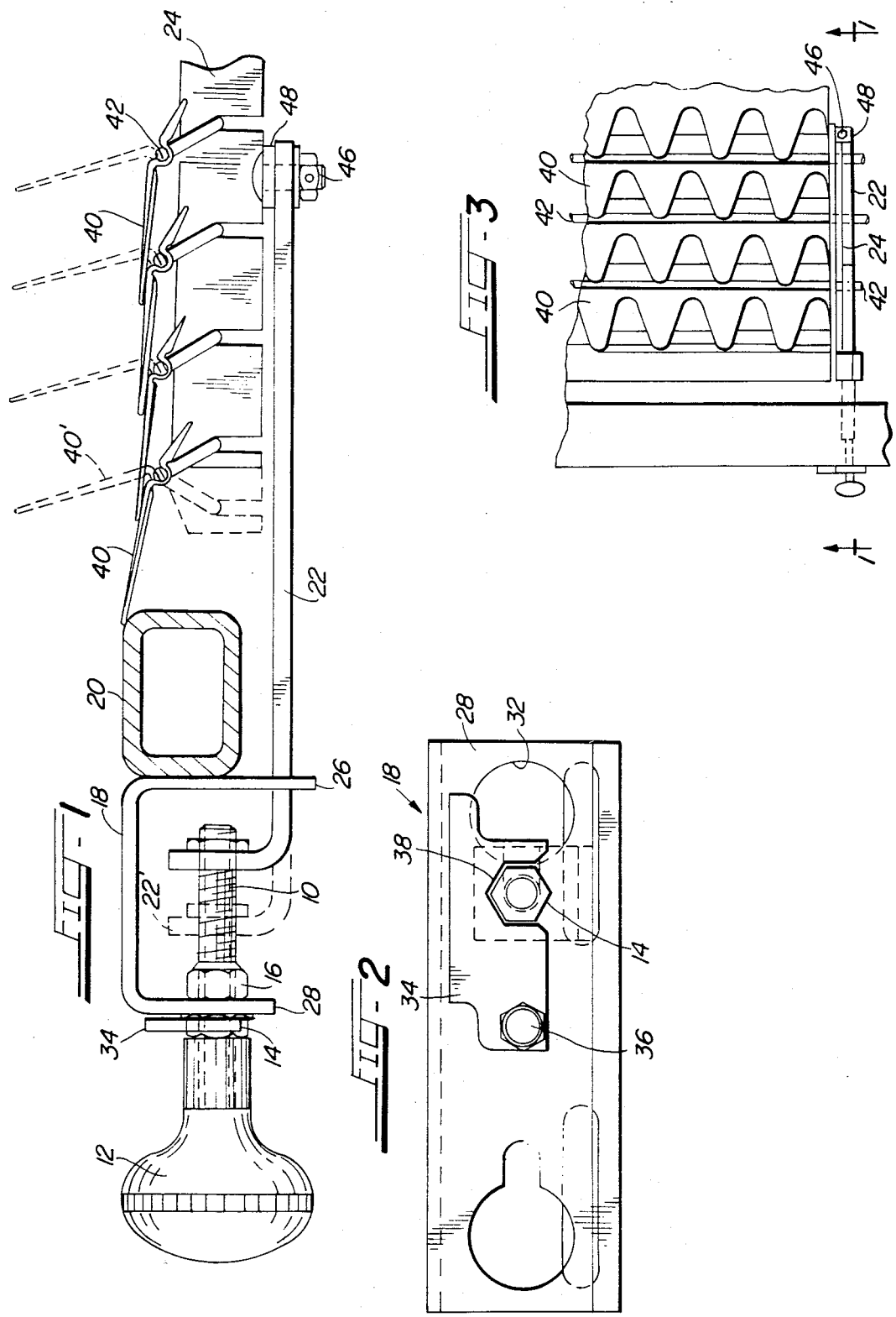

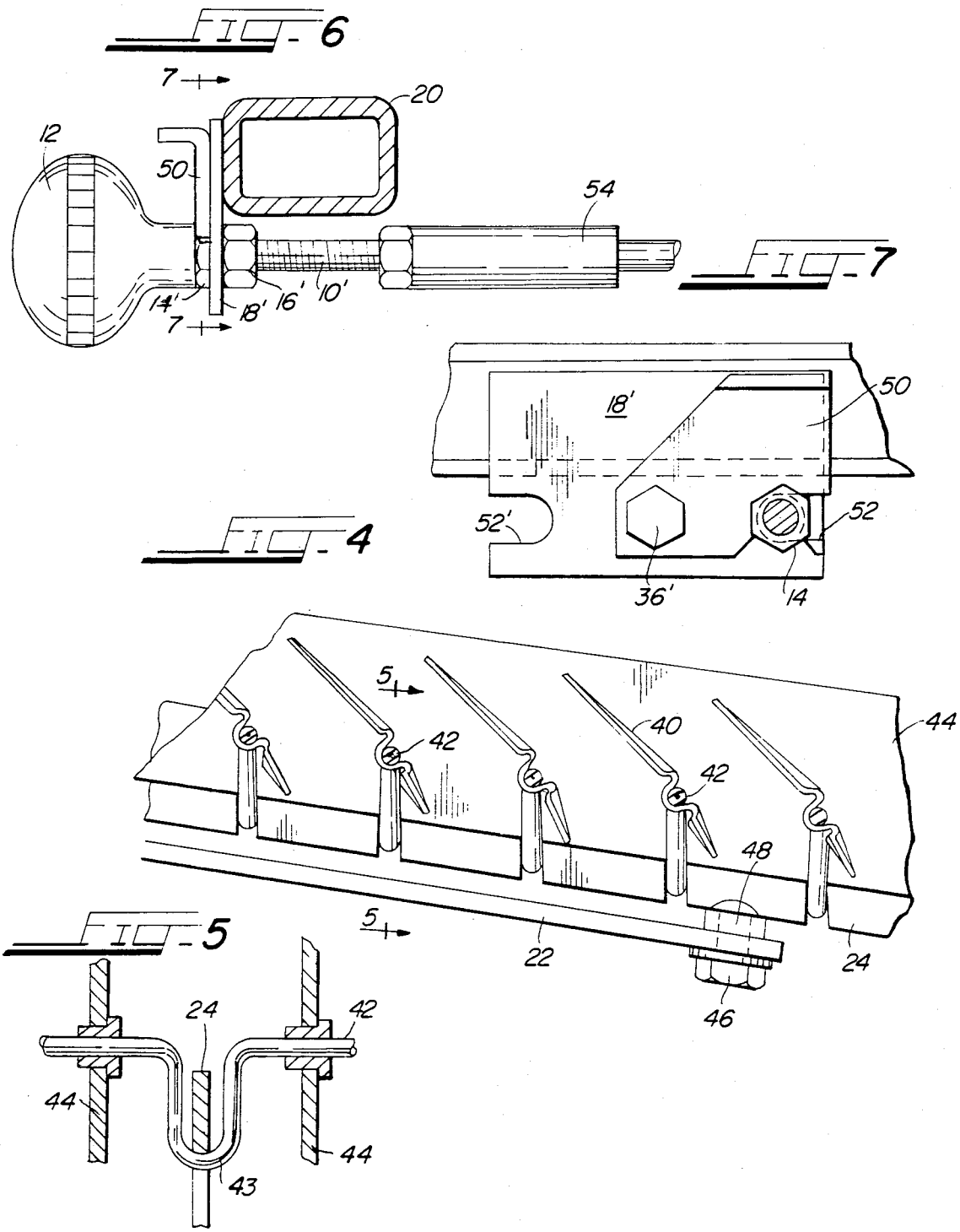

INFINITE ADJUSTMENT MEANS FOR SIEVE AND CHAFFER SLATS

BACKGROUND OF THE INVENTION

This invention concerns the means for operating the parallel transversely-extending slats of conventional sieves and chaffers comprising the cleaning means for harvester combines, in order to open them for removal of stalks and other relatively large debris and to then return the slats to their normal operating position. Heretofore, the slats of these devices were opened and closed simultaneously, for cleaning purposes, by means of a suitable lever or handle means connected with a slotted strap or bar extending transversely of the slats and engaged with crank means formed in each of the wires or rods on which the slats are mounted for oscillating them simultaneously. Constructions of this kind are illustrated by U.S. Pat. Nos. 2,253,296, 2,262,099 and 2,413,382. The disadvantages of these prior arrangements reside mainly in that proper adjustment of the operating opening of the slats was difficult to attain and once the slats were opened, it was almost impossible to repeatedly return the slats to precisely their originally set position because of wear in the lever or handle mounting arrangement, loosening of the connections between the operating lever and the slotted strap or bar and wear in the mutually engaging portions of the adjusting strap and the cranks formed in the slat carrying rods. Efforts to overcome these difficulties culminated in the herein described invention.

SUMMARY OF THE INVENTION

Concisely, the invention comprises the provision of a screw type operating or control member carried by a mounting plate which in turn is secured to the rear tube of the chaffer frame, the mounting means including a pivoted latch member designed for latching engagement with a noncircular portion fixed to the adjusting screw which in turn is engaged with the mounting plate so as to be held firmly against axial movement. With this screw adjustment means, a very fine adjustment of the angular position of the chaffer slats can be had. Also, the adjusting screw is so engaged with the mounting plate that it can be disengaged and pushed and pulled in the axial direction when it is desired to open and close the slats for cleaning of the chaffer unit. This arrangement is particularly made so that if the screw is not turned during operation and is properly positioned for re-engagement with the mounting plate, the chaffer slats will be returned to their precise preset angular position for normal chaffer operation.

DESCRIPTION OF THE DRAWINGS

A specific embodiment of this invention is illustrated by the accompanying drawings, in which:

FIG. 1 is a horizontal elevational view, partly in section, of a preferred form of the slat adjusting mechanism;

FIG. 2 is a partly sectioned front view of the adjustment plate, or bracket, illustrating the mounting of the improved slat adjusting means, the operating knob being omitted;

FIG. 3 is a fragmentary plan view of the rear portion of a chaffer illustrating the nature of the slats and the sieve or mesh openings formed between the fingers of the slats for separating the grain from the chaff;

FIG. 4 is a fragmentary elevational view showing the slat adjustment mechanism with the slats in a normal operating position;

FIG. 5 is a sectional view as on line 5—5 of FIG. 4 illustrating means for supporting the slat mounting rods and the crank arrangement by means of which the rods are oscillated;

FIG. 6 is a view showing a modified form of the slat adjustment assembly and latch means; and FIG. 7 is a partially sectioned front view as on line 7—7 of FIG. 6 illustrating the modified mounting plate and latching means, the operating knob having been omitted.

DESCRIPTION OF THE ILLUSTRATED EMBODIMENTS

In the form shown in the drawings, the infinite adjusting means for chaffer slats comprises a threaded screw fixed to and extending from an operating knob for threaded connection with an adjusting bar and suitably mounted to the chaffer frame with the adjusting bar extending below the chaffer for connection with the conventional slotted strap which is engaged with suitable crank portions on the rods which carry the chaffer slats. The novelty of this invention resides in the means for mounting the adjusting screw and adjusting bar onto the chaffer frame, which means includes a latch adapted for latching engagement with the threaded adjusting screw whereby the adjusting screw is prevented from being inadvertently turned and thereby inadvertently imparting movement to the adjusting bar, which in turn affects the operating position of the chaffer slats.

In the form shown in FIG. 1 of the drawings, the adjusting screw 10 is fixed to and extends from an operating knob 12 and carries a pair of hexagonal nuts 14 and 16. This assembly of knob, screw and hexagonal nuts is carried by a mounting plate or bracket 18 which in turn is fixedly mounted on the rear chaffer frame member 20 and the adjusting screw 10 is threadedly engaged with an adjusting bar 22 which extends forwardly below the chaffer frame for connection with the conventional slotted strap 24.

In the form shown in FIGS. 1 and 2, the mounting plate 18 is of inverted U-shape of which the rear leg 26 is fixedly mounted to the rear chaffer bar 20 by means not shown and the front leg 28 of the bracket 18 carries the adjusting screw assembly. The hexagonal nuts 14 and 16 on the adjusting screw 10 are spaced apart a distance just sufficient to receive slidably the front leg 28 of the bracket 18 between them, the rear nut 14 being in jammed engagement with the shank of the adjusting knob 12. As shown in FIG. 2, the threaded screw 18 is normally held in a slot 30 extending from a relatively large opening 32 in the mounting plate or bracket 18, the leg 28 of the bracket having sliding engagement between the hexagonal nuts 14 and 16. As shown, a latching member 34 is pivotally mounted as at 36 on the leg 28 of the mounting plate and this latch member has an opening 38 in its bottom side shaped to fittingly receive the hexagonal nut 14 when in latching position.

In this manner, the adjusting screw 10 is firmly latched against rotation by means of the knob 12 thereby firmly locking the adjusting bar 22 against any longitudinal movement that might affect the position of the chaffer slats.

For operation of the adjusting means shown in FIG. 1, the latch 34 is manually lifted, to free the nut 14, and the screw assembly is moved laterally into the opening 32 in the mounting plate leg 28 and in that position, the adjusting screw is free to be moved longitudinally so as to impart movement to the adjusting bar 22, such movement generally being as a pull and push for back and forth movement of the adjusting bar 22 for operation of the chaffer slats in the usual manner for cleaning purposes.

The usual and conventional chaffer construction comprises a plurality of slats 40 suitably mounted on transversely extending wires or rods 42, the rods 42 being conventionally mounted on or extending through a pair of divider plates 44, as shown in FIG. 5, and having between them a U-shaped crank 43 engaged by the conventional slotted bar 24. By this means, back and forth movement of the adjusting bar can shift the slats 40 to any position between fully closed and fully opened positions. The fully closed position of the slats is shown in FIG. 1 and the fully opened position is shown in dotted outline, the corresponding position of the adjusting bar being indicated at 22' in that figure. Also, as indicated in FIGS. 1 and 4, adjusting bar 22 is connected to the slotted strap 24 by means of a nut and bolt 46 mounted on a lug 48 extending from the bottom of the slotted strap 24.

It is common in the construction of sieves and chaffers to build them in two sections, forward and rear, the slats of the forward section being at a different opening angle than those at the rearward section and since each section must be individually adjusted for operational setting and individually operated for cleaning purposes, the adjustment mechanism will be in duplicate and it is for that reason that the mounting plate, or bracket, is designed to mount duplicate adjusting units, as indicated in FIG. 2.

A modified and somewhat simplified form of this invention is shown in FIGS. 6 and 7, and in this case the mounting for the adjustment means is carried by a flat plate 18' mounted on the rear chaffer frame 20 and carrying a pivotedly mounted latch means 50. As shown in FIG. 7, the mounting plate 18' is open to one side to permit movement of the adjusting screw laterally outward and entirely free of the mounting plate for push and pull movement of the adjusting bar means 52 to open and close the chaffer slats and, if necessary, to shake them. In this arrangement, the hexagonal nuts 14 and 16 are spaced apart just sufficient for sliding movement of the adjusting screw into and out of the opening 52 at the end of the mounting plate 18'.

Although several embodiments of this invention are herein shown and described, it will be understood that details of the constructions shown may be altered or omitted without departing from the spirit of this invention as defined by the following claims.

We claim:

1. Means for operating and adjusting the slats of a threshing machine chaffer comprising a screw mounted on said chaffer frame, said screw having an operating knob on its outer end and a knob shank into which said screw is fixed, a mounting plate attached to the chaffer frame for holding said screw in a position extending lengthwise of the chaffer and having threaded attachment with a bar means having an operating connection with the chaffer slats, said screw extending toward the chaffer frame through an opening formed in said mounting plate and of a size sufficient to only admit passage of said screw, said opening having a lateral passage through which said screw can be released laterally from said opening, lock means on said screw on each side of said mounting plate and spaced apart for only sliding fit along said lateral passage, the one of said lock means adjacent said knob being fixed on said screw and of noncylindrical form, and a latch plate pivotally mounted on said mounting plate normal to and extending beyond said screw and having an opening in its edge shaped to receive and fit the noncylindrical lock means and hold it against rotation.

2. Chaffer slat operating means according to claim 1 wherein said lock means has threaded attachment with said screw and the one adjacent said knob being a conventional noncircular nut.

3. A chaffer slat operating means according to claim 1 wherein said lock means comprises a pair of conventional hexagonal nuts, one being disposed on each side of said mounting plate.

4. A chaffer slat operating means according to claim 1 wherein the said lateral passage for the screw opens to a space in said mounting plate sufficient to pass the shank of said knob axially toward the chaffer frame.

5. A chaffer slat operating means according to claim 1 wherein said lateral passage opens to the edge of said mounting plate whereby said screw is entirely releasable from said mounting plate.

* * * * *